US008739850B2

(12) United States Patent
Ishida

(10) Patent No.: US 8,739,850 B2
(45) Date of Patent: Jun. 3, 2014

(54) PNEUMATIC TIRE

(75) Inventor: Masahiro Ishida, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 0 days.

(21) Appl. No.: 13/529,098

(22) Filed: Jun. 21, 2012

(65) Prior Publication Data

US 2013/0000808 A1    Jan. 3, 2013

(30) Foreign Application Priority Data

Jun. 28, 2011    (JP) .................................. 2011-143551

(51) Int. Cl.
*B60C 13/00* (2006.01)
*B60C 13/02* (2006.01)

(52) U.S. Cl.
USPC ........................................................ 152/523

(58) Field of Classification Search
USPC ................................................ 152/523–525
See application file for complete search history.

(56) References Cited

U.S. PATENT DOCUMENTS

D639,728 S  *  6/2011  Ohashi ......................... D12/605

FOREIGN PATENT DOCUMENTS

| JP | 07-164831 | 6/1995 | |
| JP | 07164831 A * | 6/1995 | .............. B60C 13/00 |
| JP | 09-315111 | 12/1997 | |
| JP | 2001-191745 | 7/2001 | |
| JP | 4666109 | 4/2011 | |
| JP | 2011-235686 | 11/2011 | |

OTHER PUBLICATIONS

Machine Translation: JP07-164831; Kikuchi, Shinobu; No date.*
Notice of Rejection issued in the corresponding JP application (JP 2011-143551), full English translation, Dec. 15, 2009.

* cited by examiner

*Primary Examiner* — Justin Fischer
*Assistant Examiner* — Kendra Shin
(74) *Attorney, Agent, or Firm* — Thorpe North & Western LLP

(57) ABSTRACT

A side wall portion including, in a specific region in a tire radial direction, a decorative region including two or more decorative portions that are continuously disposed so as to be contiguous in a tire circumferential direction, the decorative portions including multiple convex ridges that are disposed on an outer surface so as to be adjacent in the tire circumferential direction. The ridges in the same decorative portion have a same ridge arrangement angle, and the ridge arrangement angle of the contiguous decorative portion differs therefrom not less than 20° and not more than 160°. In all regions in the tire circumferential direction, at least one side in the tire radial direction of the decorative portion overlaps with the contiguous decorative portion. A distance between a first imaginary boundary line and a second imaginary boundary line is less than 1 mm.

20 Claims, 6 Drawing Sheets

PNEUMATIC TIRE

PRIORITY CLAIM

Priority is claimed to Japan Patent Application Serial No. 2011-143551 filed on Jun. 28, 2011.

BACKGROUND

1. Technical Field

The present technology relates to a pneumatic tire for mounting on a vehicle.

2. Related Art

Pneumatic tires for mounting on vehicles and the like are known that have a portion (serration) in a side wall portion of the tire where multiple ridges are formed at a short pitch, the ridges being constituted by small, linear protrusions or recesses. For example, in Japanese Patent No. 3645358, a pneumatic tire in which a circular decorative body is provided on a surface of a side wall is described, the circular decorative body being formed from multiple small ridges having a height of not more than about 2 mm, disposed at a small pitch of not more than about 5 mm in a circumferential direction. Additionally, with the pneumatic tire described in Japanese Patent No. 3645358, the circular decorative body is divided into a plurality of crescentic decorative bodies on the periphery by a narrow band-like dividing band that extends in a direction inclined at a large angle, with respect to a radial direction, of not less than 70° and less than 90°. The ridges extend substantially parallel to each other within the same crescentic decorative body, and extend in a different direction in a contiguous crescentic decorative body.

As with the pneumatic tire described in Japanese Patent No. 3645358, appearance flaws of a tire can be improved by forming a serration in the side wall of the tire, the serration being constituted by multiple ridges. However, with the pneumatic tire described in Japanese Patent No. 3645358, unevennesses in the side wall portion of the tire, specifically at carcass splice portions and portions where the carcass is folded up, may not be sufficiently camouflaged. Thus, there are cases where improvement of the quality of the appearance of the tire is insufficient.

SUMMARY

The present technology provides a pneumatic tire by which the quality of the appearance of the tire can be enhanced while maintaining performance of the tire. A pneumatic tire according to the present technology includes a tread portion, a side wall portion, and a bead portion. The side wall portion includes, in a specific region in a tire radial direction, a decorative region including two or more decorative portions that are continuously disposed so as to be contiguous in a tire circumferential direction, the decorative portions including multiple convex ridges that are disposed on an outer surface so as to be adjacent in the tire circumferential direction. A ridge arrangement angle, which is an angle formed by the ridges and a line tangent to the decorative region at an edge of an inner side in the tire radial direction, is the same in the same decorative portion, and a ridge arrangement angle of the contiguous decorative portion differs therefrom not less than 20° and not more than 160°. In all regions in the tire circumferential direction, at least one side in the tire radial direction of the decorative portion overlaps with the contiguous decorative portion. A first imaginary boundary line joining end portions of the ridges of the decorative portion that are on a side adjacent to the contiguous decorative portion and a second imaginary boundary line joining end portions of the ridges of the contiguous decorative portion on a side adjacent to the first imaginary boundary line extend from an inner side edge to an outer side edge in the tire radial direction, and a distance between the first imaginary boundary line and the second imaginary boundary line is less than 1 mm.

Unevennesses in the side wall portion of the tire, specifically at carcass splice portions and portions where the carcass is folded up, are more appropriately camouflaged due to the providing of the decorative region in the side wall portion. Therefore, it is possible to realize a superior three-dimensional appearance of the pneumatic tire. As a result, the quality of the appearance of the tire can be enhanced while maintaining performance of the tire.

Ridges of the decorative portion are preferably separated from ridges of the contiguous decorative portion. As a result, cracking can be more favorably suppressed and durability can be enhanced.

Additionally, the decorative region preferably includes not less than three types and not more than nine types of the decorative portions having different ridge arrangement angles. As a result, unevennesses at carcass splice portions and portions where the carcass is folded up can be more appropriately camouflaged and a superior three-dimensional appearance of the pneumatic tire can be realized.

Moreover, a plurality of the decorative portions is preferably disposed in the decorative region in the tire circumferential direction, in order of stepwise ascending or descending size of the ridge arrangement angle. As a result, a superior three-dimensional appearance of the pneumatic tire can be realized.

Additionally, with the decorative region, an angle formed by an end portion on an inner side in the tire radial direction of the first imaginary boundary line of the decorative portion and an end portion on an inner side in the tire radial direction of the first imaginary boundary line of the contiguous decorative portion is preferably not more than 10°. As a result, unevennesses at carcass splice portions and portions where the carcass is folded up can be more appropriately camouflaged and a superior three-dimensional appearance can be realized.

At least one of the decorative portions included in the decorative region preferably has an arrangement pitch different than the arrangement pitch of the ridges included in the decorative portions. Unevennesses at carcass splice portions and portions where the carcass is folded up can be sufficiently camouflaged and a superior three-dimensional appearance can be realized.

According to the pneumatic tire of the present technology, a pneumatic tire by which the quality of the appearance of the tire is enhanced while maintaining performance of the tire can be provided.

DETAILED DESCRIPTION

An embodiment of the present technology is described below in detail based on the drawings. However, the present technology is not limited to this embodiment. The constituents of the embodiment include constituents that can be easily replaced by those skilled in the art and constituents substantially same as the constituents of the embodiment. Furthermore, the multiple modified examples described in the embodiment can be combined as desired within the scope apparent to a person skilled in the art.

In the following descriptions, additionally, "tire width direction" refers to a direction parallel to a rotational axis (not shown) of a pneumatic tire 1, and "outer side in the tire width direction" refers to a side distanced from a tire equatorial plane (tire equator) in the tire width direction. "Tire circumferential direction" refers to a circumferential direction with the rotational axis as the center axis. Furthermore, "tire radial direction" refers to the direction orthogonal to the rotational axis; "inner side in the tire radial direction" refers to the side facing the rotational axis in the tire radial direction; and "outer side in tire radial direction" refers to the side distanced from the rotational axis in the tire radial direction. Additionally, "tire equatorial plane" refers to a planar surface orthogonal to the rotational axis and that passes through a center of a tire width of the pneumatic tire 1. The tire width is the width in the tire width direction between constituents located to the outside in the tire width direction, or in other words, the distance between the most distant constituents from the tire equatorial plane in the tire width direction. Furthermore, "tire equator" refers to a line in the circumferential direction of the pneumatic tire 1 that lies on the tire equatorial plane.

Figure 1:
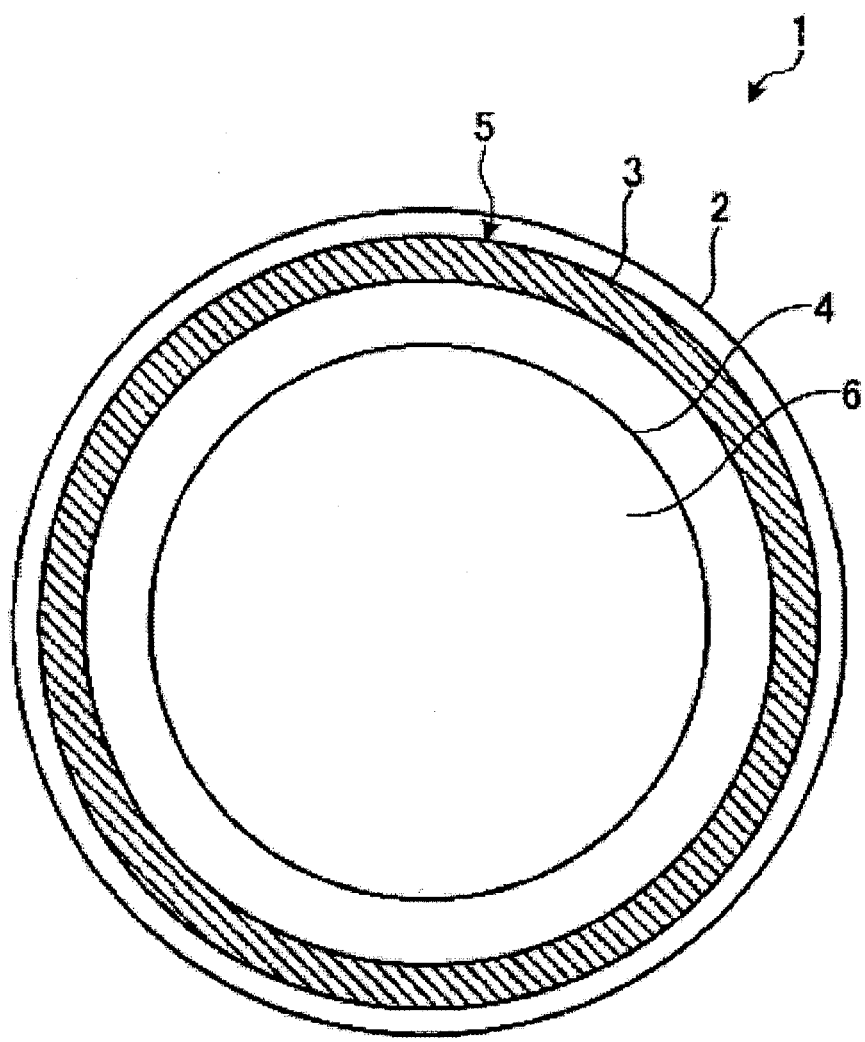
FIG. 1 is a side view of a pneumatic tire according to an embodiment of the present technology.
Figure 2:
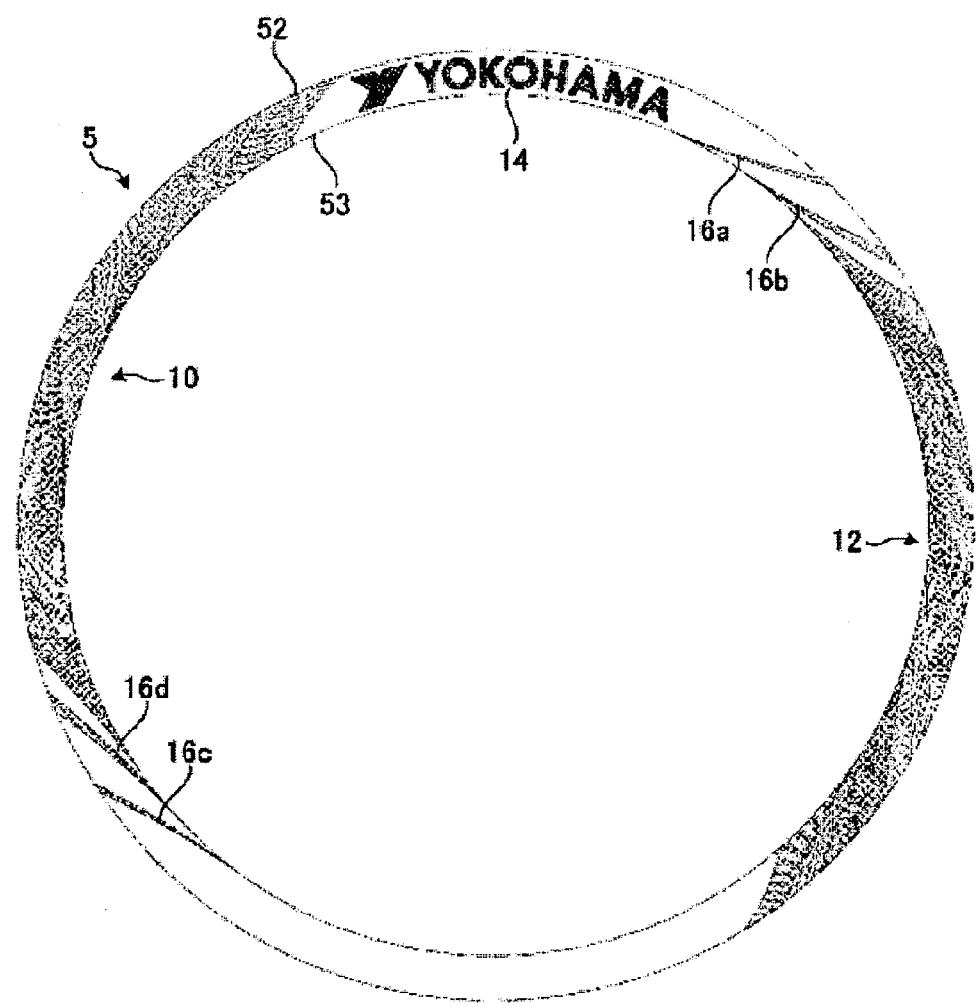
FIG. 2 is an explanatory drawing illustrating a serration portion of the pneumatic tire depicted in FIG. 1.
Figure 3:
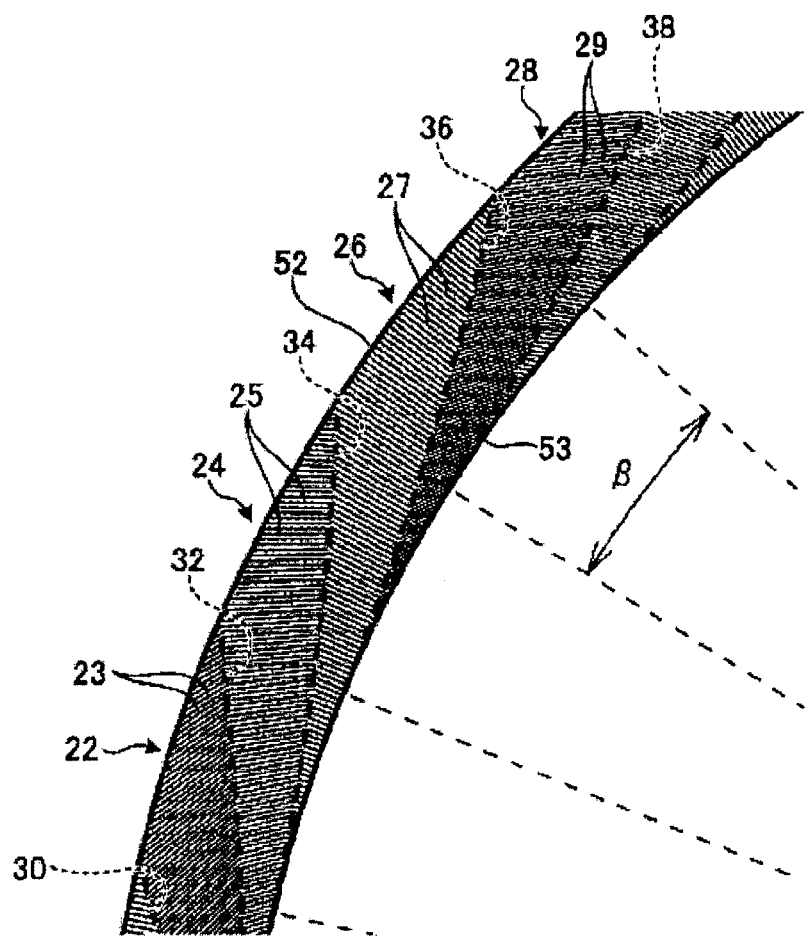
FIG. 3 is an enlarged side view illustrating a decorative region of the serration portion.
Figure 4:
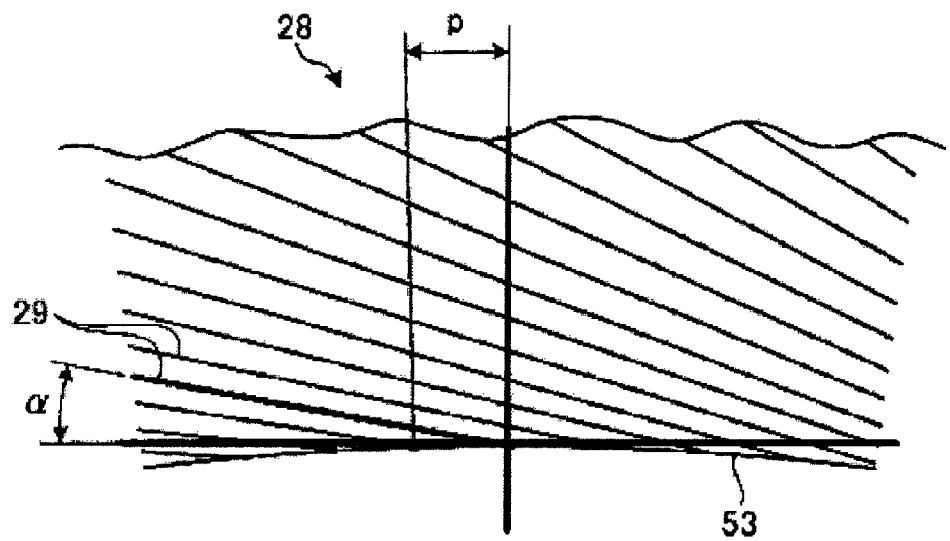
FIG. 4 is an enlarged side view illustrating a decorative portion.
Figure 5:
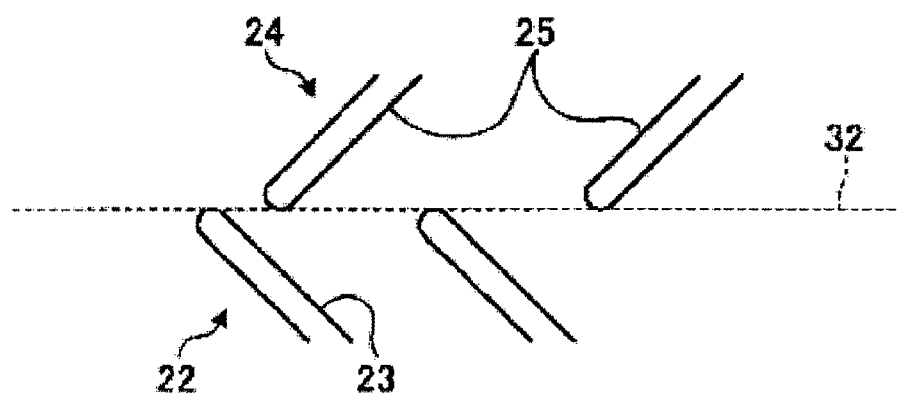
FIG. 5 is an enlarged side view illustrating an area around a boundary between decorative portions.

FIG. 1 is a side view of a pneumatic tire according to an embodiment of the present technology. FIG. 2 is an explanatory drawing illustrating a serration portion of the pneumatic tire depicted in FIG. 1. FIG. 3 is an enlarged side view illustrating a decorative region of the serration portion. FIG. 4 is an enlarged side view illustrating a decorative portion. FIG. 5 is an enlarged side view illustrating an area around a boundary between decorative portions. As illustrated in FIG. 1, the pneumatic tire 1 includes a tread portion 2 that is in contact with a road surface; a side wall portion 3 that is rim assembled on a rim 6 and is visible on the outermost side in the tire width direction of the pneumatic tire 1 when mounted on a vehicle; and a bead portion 4 that interlocks with this rim 6 when the pneumatic tire is assembled on the rim 6.

As illustrated in FIGS. 1 and 2, the side wall portion 3 has a serration portion 5 on a surface thereof. The serration portion 5 is formed in a shape that extends along the tire circumferential direction within a predetermined range in the tire radial direction of the side wall portion 3 or, in other words, in a circular shape. The serration portion 5 is fundamentally provided in a predetermined region in the tire radial direction, that is, in a region including a position outermost in the tire width direction, a position of an end portion where a carcass (not illustrated), which constitutes a skeleton of the pneumatic tire 1, is folded over the bead portion 4, and overlapping portions of the carcass (carcass splice portions).

As illustrated in FIG. 2, the serration portion 5 includes a first decorative region 10, a second decorative region 12, a mark forming region 14, and independent decorative portions 16a, 16b, 16c, and 16d in a toric region surrounded by an outer ring 52 and an inner ring 53. The outer ring 52 and the inner ring 53 are circles having a center of the pneumatic tire 1 in the radial direction as centers. Additionally, the outer ring 52 is a circle with a diameter greater than that of the inner ring 53. The first decorative region 10, the second decorative region 12, the mark forming region 14, and the independent decorative portions 16a, 16b, 16c, and 16d that constitute the serration portion 5 are formed at different positions in the tire circumferential direction. Specifically, in the clockwise direction in FIG. 2, the first decorative region 10, the mark forming region 14, the independent decorative portion 16a, the independent decorative portion 16b, the second decorative region 12, the independent decorative portions 16c, and the independent decorative portion 16d are sequentially disposed in the serration portion 5 in the tire circumferential direction. Additionally, in the serration portion 5, the first decorative region 10 is disposed after the independent decorative portion 16d in the clockwise direction in the tire circumferential direction.

As illustrated in FIG. 3, the first decorative region 10 includes a plurality of decorative portions 22, 24, 26, and 28 that are disposed continuously in the tire circumferential direction. Note that in FIG. 3, of the decorative portions constituting the first decorative region 10, only the decorative portions 22, 24, 26, and 28 were given reference numbers, but four or more decorative portions are provided. The number of decorative portions constituting the first decorative region 10 is not particularly limited, and it is sufficient that not less than two of the decorative portions are provided, and not less than three of the decorative portions are preferably provided.

The decorative portion 22 is a region surrounded by an imaginary boundary line 30 and an imaginary boundary line 32. First end portions of the imaginary boundary line 30 and the imaginary boundary line 32 are located at the outer ring 52, and second end portions are located at the inner ring 53. In other words, the imaginary boundary line 30 and the imaginary boundary line 32 are curved lines extending from edge to edge in the radial direction of the first decorative region 10. The decorative portion 22 includes a plurality of ridges 23. The ridges 23 are protrusions that protrude in the tire width direction, and extend in any single direction on the tire surface. The plurality of ridges 23 of the decorative portion 22 is disposed in rows in a direction orthogonal to the extending direction thereof. Additionally, an angle (hereinafter referred to as the "ridge arrangement angle") formed by a straight line and a line tangent to the inner ring 53 at a contact point between a line extended from a straight line of the ridges 23 and the inner ring 53 (hereinafter also referred to as the "ridge starting point") is the same angle. Note that it is sufficient that the imaginary boundary lines 30 and 32 are imaginary lines that demarcate the edges of the decorative portion 22, and need not be formed so as to be actually visible on the decorative portion 22. The imaginary boundary lines 30 and 32 are lines that join end portions (end portions on a first side or end portions on a second side) of the ridges 23 formed in the corresponding decorative portion 22. Additionally a central angle of an arc of a portion where the decorative portion 22 contacts the inner ring 53 or, in other words, an angle formed by a line joining an end portion of the imaginary boundary line 30 on the inner ring 53 side and the center of the serration portion 5 and a line joining an end portion of the imaginary boundary line 32 on the inner ring 53 side and the center of the serration portion 5 is β.

The decorative portion 24 is a region surrounded by the imaginary boundary line 32 and an imaginary boundary line 34. The imaginary boundary line 34 is a curved line extending from edge to edge in the radial direction of the first decorative region 10, the same as the imaginary boundary lines 30 and 32. A plurality of ridges 25 is disposed in rows in the decorative portion 24, the same as in the decorative portion 22. Additionally, a ridge arrangement angle of the ridges 25 is an angle that is different from the ridge arrangement angle of the ridges 23. Moreover, the central angle β of an arc of a portion where the decorative portion 24 contacts the inner ring 53 is the same angle as the central angle β of the arc of the portion where the decorative portion 22 contacts the inner ring 53.

The decorative portion 26 is a region surrounded by the imaginary boundary line 34 and an imaginary boundary line 36. The imaginary boundary line 36 is a curved line extending from edge to edge in the radial direction of the first decorative region 10, the same as the imaginary boundary lines 30, 32, and 34. A plurality of ridges 27 is disposed in rows in the decorative portion 26, the same as in the decorative portions 22 and 24. Additionally, a ridge arrangement angle of the ridges 27 is an angle that is different from the ridge arrangement angle of the ridges 25. Moreover, the central angle β of an arc of a portion where the decorative portion 26 contacts the inner ring 53 is the same angle as the central angle β of the arc of the portion where the decorative portion 22 contacts the inner ring 53.

The decorative portion 28 is a region surrounded by the imaginary boundary line 36 and an imaginary boundary line 38. The imaginary boundary line 38 is a curved line extending from edge to edge in the radial direction of the first decorative region 10, the same as the imaginary boundary lines 30, 32, 34 and 36. A plurality of ridges 29 is disposed in rows in the decorative portion 28, the same as in the decorative portions 22, 24, and 26. Additionally, a ridge arrangement angle of the ridges 29 is an angle that is different from the ridge arrangement angle of the ridges 27. Moreover, the central angle β of an arc of a portion where the decorative portion 28 contacts the inner ring 53 is the same angle as the central angle β of the arc of the portion where the decorative portion 22 contacts the inner ring 53.

Next, the ridges of the decorative portions will be described using FIG. 4. Note that the ridges formed in the decorative portions are formed so as to be fundamentally identical, with the exception that the angle at which they are formed is different. Therefore, the ridges 29 formed in the decorative portion 28 are described below, being representative of the ridges formed in the decorative portions. As illustrated in FIG. 4, the angle (ridge arrangement angle) that the ridges 29 form with a line tangent to the inner ring 53 at the ridge starting point where the ridges 29 contact the inner ring 53 is an angle α. Thus, depending on the position where the ridges 29 are formed, the angle formed with the line tangent to the inner ring 53 at the ridge starting point varies. Therefore, a shape is formed in which a distance between adjacent ridges 29 increases from the inner ring 53 toward the outer ring 52. Additionally, the ridges 29 are disposed at a spacing so that a distance p (arrangement pitch) between the ridge starting point of one of the ridges 29 and a ridge starting point of an adjacent ridge 29 is constant. Note that with the ridges 29 illustrated in FIG. 4, the ridges extend to a position contacting the inner ring 53, but in cases where the end portions of the ridges 29 on the inner ring 53 side do not contact the inner ring 53, specifically, in cases where the end portions contact an imaginary boundary line, it is sufficient that extended lines of the ridges 29 satisfy the relationship between the ridge arrangement angle α and the arrangement pitch p.

Here, the arrangement pitch p of the ridges is preferably not less than 0.5 mm and not more than 5.0 mm. When the arrangement pitch p of the ridges is within the range described above, the ridges can be disposed at an appropriate spacing in the decorative region.

Next, ridges near the imaginary boundary line will be described using FIG. 5. Note that a relationship of the ridges of two contiguous decorative portions near the imaginary boundary line is the same. Therefore, the relationship at the imaginary boundary line 32 between the ridges 23 of the decorative portion 22 and the ridges 25 of the contiguous decorative portion 24 is described below, being representative of relationships near the imaginary boundary line of the ridges of two contiguous decorative portions. As illustrated in FIG. 5, first end portions of the ridges 23 of the decorative portion 22 extend to the imaginary boundary line 32. Additionally, second end portions of the ridges 25 of the decorative portion 24 extend to the imaginary boundary line 32. In other words, the imaginary boundary line 32 is a line joining the first end portions of the ridges 23 of the decorative portion 22 and is a line joining the second end portions of the ridges 25 of the decorative portion 24. As illustrated in FIG. 5, the ridges 23 of the decorative portion 22 are formed at positions that do not overlap with the ridges 25 of the decorative portion 24. Specifically, the ridges 23 of the decorative portion 22 are formed at positions different from those of the ridges 25 of the decorative portion 24, and even though the end portions of both ridges 23 and 25 are positioned on the imaginary boundary line 32, the first end portions of the ridges 23 of the decorative portion 22 do not overlap with the second end portions of the ridges 25 of the decorative portion 24.

Each of the decorative portions of the first decorative region 10 are configured as described above. Additionally, the ridge arrangement angle α of one of the decorative portions is different than the ridge arrangement angle α of the contiguous decorative portion. Specifically, the ridge arrangement angle α of one of the decorative portions differs from the ridge arrangement angle α of the contiguous decorative portion by not less than 20° and not more than 160°. Additionally, the first decorative region 10 has a shape including not less than two decorative portions on a cut face when cut in the tire radial direction, except in cases where a decorative portion at an edge in the tire circumferential direction is cut. Specifically, the decorative portions overlap with at least one other contiguous decorative portion in the tire radial direction throughout all regions in the tire circumferential direction. In other words, at least one imaginary boundary line is disposed in the first decorative region 10 at any position in the tire circumferential direction.

Next, returning to FIG. 2, configurations of each component of the serration portion 5 will be described. The second decorative region 12 includes a plurality of the decorative portions that are disposed continuously in the tire circumferential direction, the same as with the first decorative region 10. The number of the decorative portions, the ridge arrangement angle α of each of the decorative portions, the arrangement pitch p of the ridges of each of the decorative portions, and the like of the second decorative region 12 differ, but a form thereof is such that a relationship with the contiguous decorative portion satisfies the same conditions as with the first decorative region 10.

The mark forming region 14 is a region for forming marks, product names, and the like for identifying a tire. The marks and the like formed in the mark forming region 14 may be expressed using protruding shapes and recessed shapes formed in the side wall portion 3. Note that the protruding shapes and recesses formed in the side wall portion 3 have a form where juxtaposed protrusions extending in a single direction are formed, as with the ridges described above. A length of the ridges is adjusted and, thereby, marks are expressed.

The independent decorative portions 16a, 16b, 16c, and 16d have the same configuration as the decorative portions of the first decorative region 10 and the second decorative region 12 described above. The independent decorative portions 16a, 16b, 16c, and 16d are regions surrounded by a boundary line and a boundary line. A first end portion of the boundary lines of the independent decorative portions 16a, 16b, 16c, and 16d is positioned at the outer ring 52 and a second end portion is positioned at the inner ring 53 the same as with the imaginary boundary line. In other words, the boundary lines are straight lines extending from edge to edge in the radial direction of the first decorative region 10. Each of the independent decorative portions 16a, 16b, 16c, and 16d has a plurality of ridges. The ridges are protrusions that protrude in the tire width direction, and extend in any single direction on the tire surface. The plurality of ridges of the decorative portion 22 is disposed in rows in a direction orthogonal to the extending direction thereof. Additionally, the ridges formed in the same independent decorative portion 16a, 16b, 16c, or 16d have the same ridge arrangement angle α. Here, the "boundary line" is a line that demarcates a boundary between one of the independent decorative portions 16a, 16b, 16c, and 16d and other regions. In other words, the "boundary line" is a line that demarcates a boundary between a region where the ridges are formed and a region where the ridges are not formed. Thus, the independent decorative portions 16a, 16b, 16c, and 16d are the same as the decorative portions of the first decorative region 10 and the second decorative region 12 described above, and the independent decorative portions are formed so as to be in a state of non-contact with another decorative portion.

The pneumatic tire 1 has the configuration described above and the serration portion 5 is provided in a position outermost in the tire width direction, and is provided in a region including a position of an end portion (carcass folded up portion) where a carcass (not illustrated), which constitutes a skeleton of the pneumatic tire 1, is folded over the bead portion 4, and overlapping portions of the carcass (carcass splice portions). Therefore, bulges on the surface of the side wall portion 3 at a portion where the carcass is folded over and at the carcass splice portions can be made unnoticeable while enhancing the appearance of the outermost side in the tire width direction (the side wall portion 3) by the decorative regions 10 and 12.

Furthermore, with the pneumatic tire 1, the first decorative region 10 and the second decorative region 12 are provided in the serration portion 5, formed from a plurality of continuous decorative portions that satisfy the conditions described above. Therefore, a more favorable effect of causing the bulges on the surface of the side wall portion 3 at a portion where the carcass is folded over and at the carcass splice portions to be unnoticeable can be obtained. Furthermore, with the pneumatic tire 1, the three-dimensional appearance of the side wall portion 3 can be further enhanced by providing the first decorative region 10 and the second decorative region 12 in the serration portion 5.

Specifically, with the pneumatic tire 1, the first decorative region 10 and the second decorative region 12 are each constituted by a plurality of decorative portions. The decorative portions are disposed so that at least one side in the tire radial direction overlaps with a contiguous decorative portion throughout all regions of the tire circumferential direction. Furthermore, the ridge arrangement angle α of one of the decorative portions is configured to differ from the ridge arrangement angle α of the contiguous decorative portion in a predetermined range of not less than 20° and not more than 160°. Therefore, variations in light reflection can be caused at the first decorative region 10 and the second decorative region 12, and unevennesses in the side wall portion 3 caused by carcass splice portions and portions where the carcass is folded up can be camouflaged and made unnoticeable. Additionally, the tire can be configured so as to appear three-dimensional by configuring the pneumatic tire 1 such that the decorative portions are disposed so that at least one side in the tire radial direction overlaps with a contiguous decorative portion throughout all regions of the tire circumferential direction or, in other words, such that a plurality of the decorative portions are disposed at all positions in the tire circumferential direction.

Additionally, unevennesses in the side wall portion 3 can be favorably camouflaged and the three-dimensional effect can be enhanced by configuring the pneumatic tire 1 so that the imaginary boundary lines overlap, such as in this embodiment. Note that it is not necessary that the imaginary boundary line of the decorative portion overlap with the imaginary boundary line of the contiguous decorative portion.

Figure 6:
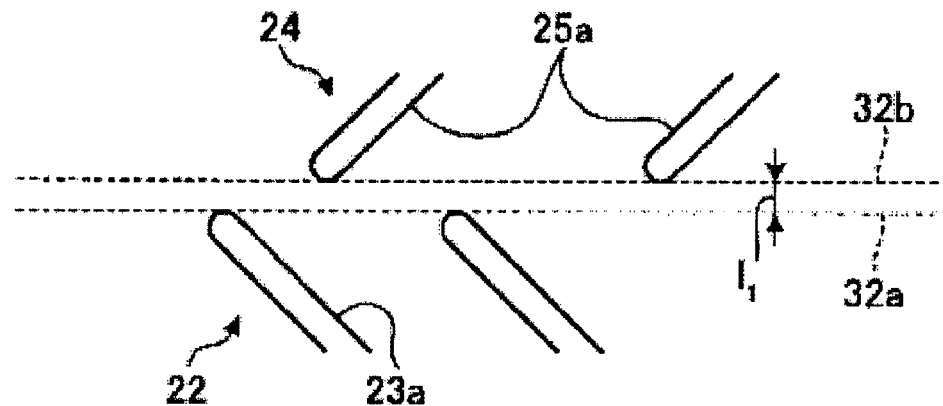
FIG. 6 is an enlarged side view illustrating another example of an area around a boundary between decorative portions.
Figure 7:
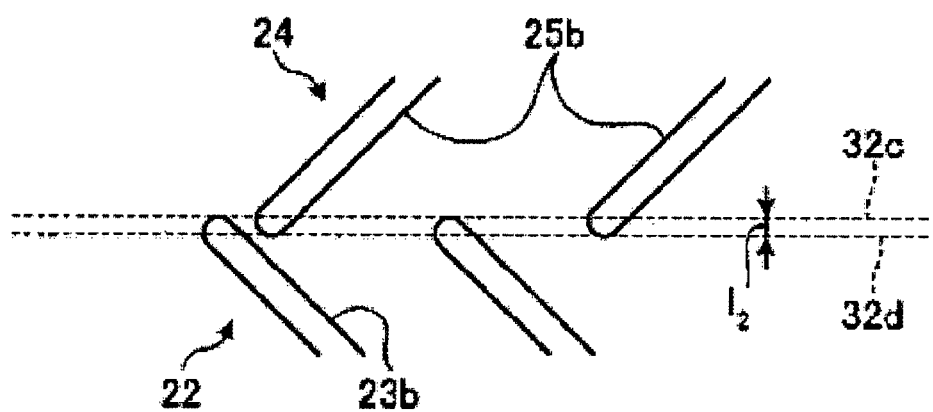
FIG. 7 is an enlarged side view illustrating another example of an area around a boundary between decorative portions.

FIGS. 6 and 7 are enlarged side views illustrating other examples of an area around a boundary between decorative portions. With the first decorative region 10 illustrated in FIG. 6, an imaginary boundary line 32a joining first end portions of ridges 23a in the decorative portion 22 and imaginary boundary line 32b joining second end portions of ridges 25a in the decorative portion 24 are separated by a distance $l_1$. Ridges are not formed between the imaginary boundary line 32a and the imaginary boundary line 32b in the first decorative region 10 illustrated in FIG. 6. Next, with the first decorative region 10 illustrated in FIG. 7, an imaginary boundary line 32c joining first end portions of ridges 23b in the decorative portion 22 and imaginary boundary line 32d joining second end portions of ridges 25b in the decorative portion 24 are separated by a distance $l_2$. The ridges 23b and the ridges 25b are both formed between the imaginary boundary line 32c and the imaginary boundary line 32d in the first decorative region 10 illustrated in FIG. 7 or, rather, the ridges overlap.

With the pneumatic tire 1, when the first imaginary boundary line joining the end portions of the ridges of a decorative portion that are on a side adjacent to a contiguous decorative portion is separated from the second imaginary boundary line joining end portions of the ridges of the contiguous decorative portion on a side adjacent to the first imaginary boundary line as illustrated in FIG. 6, or these lines overlap as illustrated in FIG. 7, the distance between the first imaginary boundary line and the second imaginary boundary line (i.e. the distance $l_1$ or the distance $l_2$) is configured to be less than 1 mm. Thus, the effects described above can be obtained.

Additionally, as described in this embodiment, with the pneumatic tire 1, ridge end portions of contiguous decorative portions are formed so as to be disconnected and, therefore, generation and growth of cracks in the recesses of the ridges can be suppressed and durability can be enhanced. With the pneumatic tire 1, the ridges of the decorative portion and the ridges of the contiguous decorative portion preferably have a disconnected form, because such a configuration leads to the effects described above being obtained. However, alternately, the ridges of the decorative portion and the ridges of the contiguous decorative portion may have a connected form.

The pneumatic tire 1 of this embodiment has been described wherein the imaginary boundary line 32, 34, 36, and 38 are curved lines extending from the outer ring 52 to the inner ring 53, but is not limited thereto. It is sufficient that the imaginary boundary lines that demarcate boundaries of the decorative portions be lines that extend from the outer ring 52 to the inner ring 53 or, rather, lines that extend from edge to edge in the radial direction of the serration portion 5 (the first decorative region 10 and the second decorative region 12), and these may be straight lines or combinations of straight lines and curved lines.

Moreover, the pneumatic tire 1 of this embodiment has been described wherein two decorative regions, the first decorative region 10 and the second decorative region 12, are provided in the serration portion 5, but the number of the decorative regions is not particularly limited. It is sufficient that the serration portion 5 includes at least one decorative region and may include three or more decorative regions. Additionally, with the pneumatic tire 1, the decorative region may not be provided throughout the entire circumference in the tire circumferential direction as in this embodiment, and also may be provided throughout the entire circumference.

The decorative region of the serration portion 5 (the first decorative region 10 and/or the second decorative region 12) preferably has not less than three types and not more than nine types of the decorative portions having different ridge arrangement angles α. In other words, the decorative region preferably has a configuration including a combination of decorative portions having not less than three types and not more than nine types of ridge arrangement angles α. Thus, the effect of camouflaging the unevennesses of the side wall portion 3 can be enhanced by providing not less than three types and not more than nine types of the ridge arrangement angles α of the decorative portions.

Additionally, the plurality of decorative portions is preferably disposed in the decorative region of the serration portion 5 (the first decorative region 10 and/or the second decorative region 12) in the tire circumferential direction, in order of stepwise ascending or descending size of the ridge arrangement angle α. In other words, the decorative portions are preferably disposed in order of stepwise ascending or descending size of the ridge arrangement angle α. Thus, the tire can be made to appear more three-dimensional by varying the ridge arrangement angle α in a stepwise manner.

Additionally, with the decorative region of the serration portion 5 (the first decorative region 10 and/or the second decorative region 12), an angle formed between the end portion of the first imaginary boundary line of a decorative portion on the inner side in the tire radial direction and the end portion of a first boundary line of a contiguous decorative portion on the inner side in the tire radial direction, in other words, an angle β formed as described above (the center angle of the arc of the portion where the decorative portion contacts the inner ring, the angle formed by a line joining an end portion of one imaginary boundary line on the inner ring side and the center of the serration portion 5 and a line joining an end portion of another imaginary boundary line on the inner ring side and the center of the serration portion 5) is preferably configured to be not more than 10°. The effect of camouflaging the unevennesses of the side wall portion 3 can be enhanced by configuring the angle β formed as described above to be not more than 10°. The formed angle β is more preferably configured to be not less than 1° and not more than 5°. The effect of camouflaging the unevennesses of the side wall portion 3 can be further enhanced by configuring the formed angle β to be within the range described above.

Additionally, with the pneumatic tire 1 of this embodiment, the angle β formed by the end portion of the one imaginary boundary line and the end portion of the other imaginary boundary line was configured to be the same in the decorative region, but the angle may also be varied. In other words, in the decorative region, a width in the radial direction may vary per decorative portion.

At least one decorative portion included in the decorative region of the serration portion 5 (the first decorative region 10 and/or the second decorative region 12) preferably has an arrangement pitch p different than the arrangement pitch p of the ridges included in the decorative portions. In other words, with the decorative region of the serration portion 5, decorative portions that have different arrangement pitches p of the ridges preferably exist in the decorative region. The decorative region of the serration portion 5 includes decorative portions with different ridge arrangement pitches p and, therefore, variations in light reflection can be more favorably caused, and the effect of camouflaging the unevennesses of the side wall portion 3 can be enhanced. The decorative portions having different ridge arrangement pitches p are preferably disposed in the decorative region of the serration portion 5 so as to repeat in the tire circumferential direction. Thus, the tire can be configured so as to appear more three-dimensional.

Figure 8:
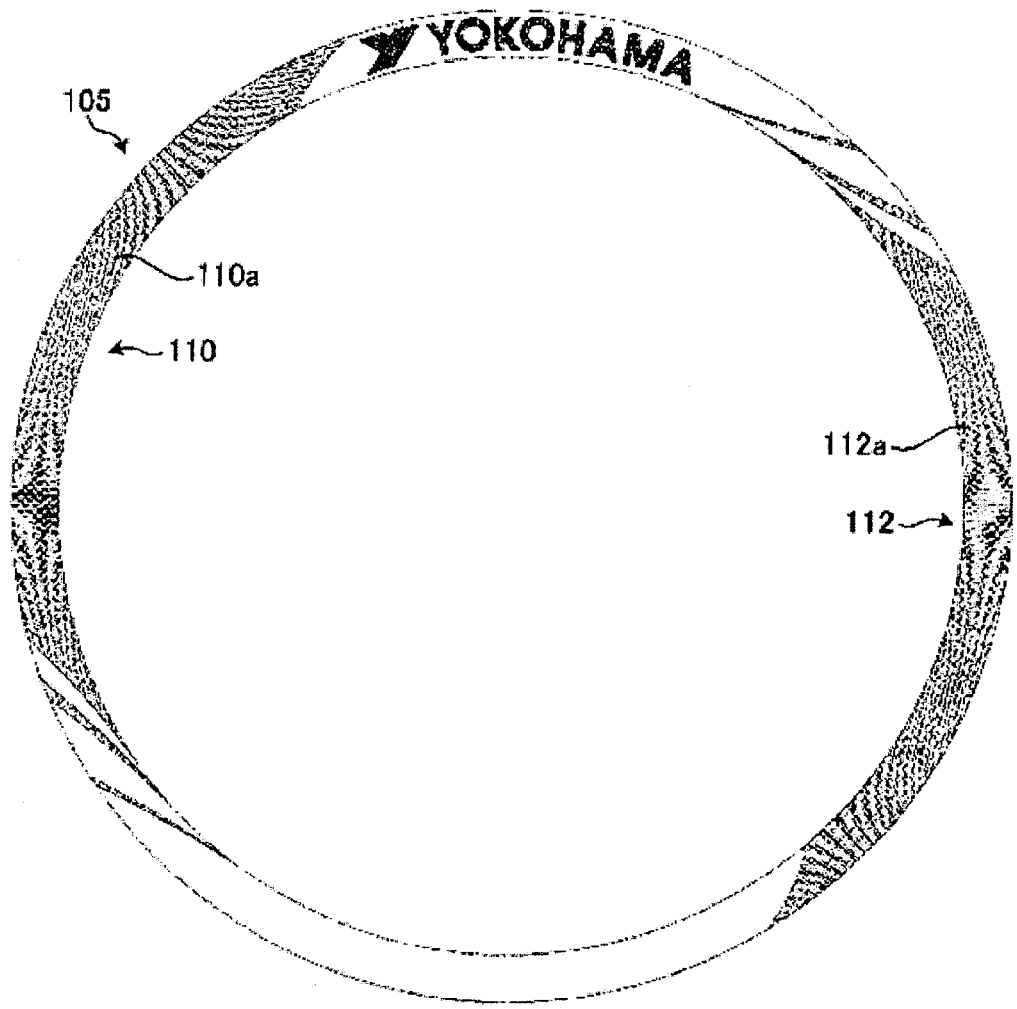
FIG. 8 is an explanatory drawing illustrating another example of a serration portion of the pneumatic tire.

Next, the pneumatic tire will be explained in more detail using test examples. FIG. 8 is an explanatory drawing illustrating another example of a serration portion of the pneumatic tire. In the test examples, a pneumatic tire having a tire size of 205/55R16 91V and a rim size of 16×6.5 JJ was used. Ridges that constitute decorative regions of a Conventional Example, Comparative Examples, and Working Examples were formed in regions corresponding to the first decorative region 10 and the second decorative region 12 of the serration portion of a pneumatic tire having the size described above. Each tire was then evaluated based on various criteria.

As illustrated in FIG. 8, the pneumatic tire of the Conventional Example was configured such that multiple ridges 110a were formed in a first decorative region 110, and multiple ridges 112a were formed in a second decorative region 112 of a serration portion 105. Note that the multiple ridges 110a formed in the first decorative region 110 have a ridge arrangement angle α of 90° or, in other words, a straight line of the ridges 110a has a form that is orthogonal to a straight line of the inner ring (a form in which an extended line of the ridges 110a passes through a center of the tire). Additionally, the multiple ridges 112a formed in the second decorative region 112 are configured in the same manner. Moreover, in the Conventional Example, the first decorative region 110 and the second decorative region 112 have configurations in which the ridges 110a and 112a, having the same form, are disposed in juxtaposition. Therefore, there is only one type of decorative portion.

In the test examples, pneumatic tires of Comparative Examples 1 to 3 were evaluated as Comparative Examples. The pneumatic tire of Comparative Example 1 had three types of decorative portions, and a difference in the ridge arrangement angles of contiguous decorative portions (difference between the ridge arrangement angle α of one decorative portion and the ridge arrangement angle α of a contiguous decorative portion) was 15°. Specifically, three types of decorative portions were provided having ridge arrangement angles α of 90°, 75°, and 60°, and these three types of decorative portions were arranged. The number of types of different decorative portions in the tire radial directions or, in other words, the number of decorative portions overlapping in the tire radial direction (having the same position in the tire circumferential direction) was two. The relationship between the ridges of contiguous decorative portions was such that the ridges were disconnected. The angle formed by the starting ends of adjacent boundary lines (imaginary boundary lines) or, rather, the formed angle β was 5°. Decorative portions where the arrangement pitch p of the ridges was different were absent or, rather, the arrangement pitches p of all of the decorative portions was the same pitch.

The pneumatic tire of Comparative Example 2 had three types of decorative portions, and a difference in the ridge arrangement angles of contiguous decorative portions was 30°. Specifically, three types of decorative portions were provided having ridge arrangement angles α of 90°, 60°, and 30°, and these three types of decorative portions were arranged. The number of types of different decorative portions in the tire radial directions or, rather, the number of decorative portions overlapping in the tire radial direction was one. In other words, the form of the decorative portions was such that a decorative portion had a portion that did not overlap with other decorative portions in the radial direction. The relationship between the ridges of contiguous decorative portions was such that the ridges were disconnected. The angle β formed by the starting ends of adjacent boundary lines was 5°. Decorative portions where the arrangement pitch p of the ridges was different were absent.

The pneumatic tire of Comparative Example 3 had twelve types of decorative portions, and a difference in the ridge arrangement angles of contiguous decorative portions was 15°. Specifically, twelve types of decorative portions were provided having ridge arrangement angles α of 0°, 15°, 30°, 45°, 60°, 75°, 90°, 105°, 120°, 135°, 150°, and 165°, and these twelve types of decorative portions were arranged. The number of types of different decorative portions in the tire radial directions or, rather, the number of decorative portions overlapping in the tire radial direction was two. The relationship between the ridges of contiguous decorative portions was such that the ridges were disconnected. The angle β formed by the starting ends of adjacent boundary lines was 5°. Decorative portions where the arrangement pitch p of the ridges was different were absent.

Additionally, in the test examples, pneumatic tires of Working Examples 1 to 7 were evaluated as Working Examples. The pneumatic tire of Working Example 1 had three types of decorative portions, and a difference in the ridge arrangement angles of contiguous decorative portions was 30°. Specifically, three types of decorative portions were provided having ridge arrangement angles α of 90°, 60°, and 30°, and these three types of decorative portions were arranged. The number of types of different decorative portions in the tire radial directions or, rather, the number of decorative portions overlapping in the tire radial direction was two. The relationship between the ridges of contiguous decorative portions was such that the ridges were disconnected. The angle β formed by the starting ends of adjacent boundary lines was 5°. Decorative portions where the arrangement pitch p of the ridges was different were absent.

The pneumatic tire of Working Example 2 had three types of decorative portions, and a difference in the ridge arrangement angles of contiguous decorative portions was 20°. Specifically, three types of decorative portions were provided having ridge arrangement angles α of 90°, 70°, and 50°, and these three types of decorative portions were arranged. The other conditions were the same as those of the pneumatic tire of Working Example 1.

The pneumatic tire of Working Example 3 had two types of decorative portions, and a difference in the ridge arrangement angles of contiguous decorative portions was 90°. Specifically, two types of decorative portions were provided having ridge arrangement angles α of 45° and 135°, and these two types of decorative portions were alternately arranged. The other conditions were the same as those of the pneumatic tire of Working Example 1.

The pneumatic tire of Working Example 4 had two types of decorative portions, and a difference in the ridge arrangement angles of contiguous decorative portions was 90°. Specifically, two types of decorative portions were provided having ridge arrangement angles α of 45° and 135°, and these two types of decorative portions were alternatively arranged. The relationship between the ridges of contiguous decorative portions was such that the ridges were connected. The other conditions were the same as those of the pneumatic tire of Working Example 1. In other words, the pneumatic tire of Working Example 4 was the pneumatic tire of Working Example 3, except that contiguous ridges were connected.

The pneumatic tire of Working Example 5 had nine types of decorative portions, and a difference in the ridge arrangement angles of contiguous decorative portions was 20°. Specifically, nine types of decorative portions were provided having ridge arrangement angles α of 0°, 20°, 40°, 60°, 80°, 100°, 120°, 140°, and 160°, and these nine types of decorative portions were arranged. The other conditions were the same as those of the pneumatic tire of Working Example 1.

With the pneumatic tire of Working Example 6, the angle β formed by the starting ends of adjacent boundary lines was 10°. The other conditions were the same as those of the pneumatic tire of Working Example 1. With the pneumatic tire of Working Example 7, the angle β formed by the starting ends of adjacent boundary lines was 10°. Decorative portions where the arrangement pitch p of the ridges was different were present. The other conditions were the same as those of the pneumatic tire of Working Example 1.

In these test examples, each of the pneumatic tires of the Conventional Example, Comparative Examples, and Working Examples was evaluated for the four criteria of appearance (of the carcass splice portion), appearance (of the carcass folded up portion), appearance (three-dimensional view), and durability. Appearance (of the carcass splice portion) was visually evaluated for the degree to which the region corresponding with the carcass splice portion of the side wall portion stood out. The evaluation results were converted to index scores, with the index score for the Conventional Example being 100. Larger index scores indicate superior appearance of the side wall portion corresponding to the carcass splice portion. Appearance (of the carcass folded up portion) was visually evaluated for the degree to which the region corresponding with the carcass folded up portion of the side wall portion stood out. The evaluation results were converted to index scores, with the index score for the Conventional Example being 100. Larger index scores indicate superior appearance of the side wall portion corresponding to the carcass folded up portion. Appearance (three-dimensional view) was visually evaluated for the degree to which a side ridge design appeared to be three-dimensional. The evaluation results were converted to index scores, with the index score for the Conventional Example being 100. Larger index scores indicate superior three-dimensional appearance. "Durability" refers to durability against cracking in the decorative region. In these test examples, cuts having a depth of 1.5 mm and a length of 5.0 mm were formed in recesses between ridges at four locations (at equal intervals) on the periphery of the tire. The pneumatic tires in which the cuts described above are formed were inflated to an air pressure of 120 kPa, and mounted on an internal drum tester. A load equivalent to 88% of a maximum load capacity of each tire was applied, and continued traveling was performed for 62 hours at a speed of 81 km/h. Following the traveling, each of the pneumatic tires was evaluated by measuring a growth ratio of the cuts. The evaluation results were converted to index scores, with the index score for the Conventional Example being 100. Larger index scores indicate superior durability, and specifically indicate that crack growth is further suppressed. Note that in these performance tests, pneumatic tires scoring 104 or higher are considered to be superior, and pneumatic tires scoring in a range from 97 to 103 are considered to be equivalent. The results of testing the four criteria described above are shown in the following Tables 1 to 3.

TABLE 1

|  | Conventional Example | Comparative Example 1 | Comparative Example 2 | Comparative Example 3 |
|---|---|---|---|---|
| Number of types of decorative portions | 1 | 3 | 3 | 12 |
| Difference in ridge arrangement angles of contiguous decorative portions | 0 | 15 | 30 | 15 |
| Number of types of decorative portions overlapping in the radial direction | 1 | 2 | 1 | 2 |
| Relationship between ridges of contiguous decorative portions | Disconnected | Disconnected | Disconnected | Disconnected |
| Angle formed by starting ends of adjacent boundary lines | — | 5 | 5 | 5 |
| Presence/absence of decorative portion with different arrangement pitch of the ridges | Absent | Absent | Absent | Absent |
| Appearance (of the carcass splice portion) | 100 | 102 | 106 | 102 |
| Appearance (of the carcass folded up portion) | 100 | 102 | 102 | 102 |
| Appearance (three-dimensional view) | 100 | 102 | 102 | 102 |
| Durability | 100 | 106 | 106 | 106 |

TABLE 2

|  | Working Example 1 | Working Example 2 | Working Example 3 | Working Example 4 |
|---|---|---|---|---|
| Number of types of decorative portions | 3 | 3 | 2 | 2 |
| Difference in ridge arrangement angles of contiguous decorative portions | 30 | 20 | 90 | 90 |
| Number of types of decorative portions overlapping in the radial direction | 2 | 2 | 2 | 2 |
| Relationship between ridges of contiguous decorative portions | Disconnected | Disconnected | Disconnected | Connected |
| Angle formed by starting ends of adjacent boundary lines | 5 | 5 | 5 | 5 |
| Presence/absence of decorative portion with different arrangement pitch of the ridges | Absent | Absent | Absent | Absent |
| Appearance (of the carcass splice portion) | 106 | 104 | 106 | 106 |
| Appearance (of the carcass folded up portion) | 106 | 104 | 106 | 106 |
| Appearance (three-dimensional view) | 106 | 104 | 106 | 106 |
| Durability | 106 | 106 | 106 | 102 |

TABLE 3

|  | Working Example 5 | Working Example 6 | Working Example 7 |
|---|---|---|---|
| Number of types of decorative portions | 9 | 3 | 3 |
| Difference in ridge arrangement angles of contiguous decorative portions | 20 | 30 | 30 |
| Number of types of decorative portions overlapping in the radial direction | 2 | 2 | 2 |
| Relationship between ridges of contiguous decorative portions | Disconnected | Disconnected | Disconnected |
| Angle formed by starting ends of adjacent boundary lines | 5 | 10 | 10 |
| Presence/absence of decorative portion with different arrangement pitch of the ridges | Absent | Absent | Present |
| Appearance (of the carcass splice portion) | 104 | 104 | 110 |
| Appearance (of | 104 | 104 | 110 |

TABLE 3-continued

|  | Working Example 5 | Working Example 6 | Working Example 7 |
|---|---|---|---|
| the carcass folded up portion) | | | |
| Appearance (three-dimensional view) | 104 | 104 | 110 |
| Durability | 106 | 104 | 106 |

It is clear from Tables 1 to 3 that, compared to the Conventional Example and the Comparative Examples, the Working Examples were evaluated to be superior in terms of the each of the three appearance criteria. As described above, it is clear that the quality of the appearance of a tire can be enhanced while tire performance is maintained with the pneumatic tire of the present technology. Moreover, it is clear from the results of Working Examples 3 and 4 that durability can be enhanced by providing a form in which the ridges of contiguous decorative portions are disconnected.

What is claimed is:

1. A pneumatic tire comprising a tread portion, a side wall portion, and a bead portion, wherein
    the side wall portion comprises, in a specific region in a tire radial direction, a decorative region including three or more decorative portions that are continuously disposed so as to be contiguous in a tire circumferential direction, the decorative portions including multiple convex ridges that are disposed on an outer surface so as to be adjacent in the tire circumferential direction and the decorative region includes not less than three types and not more than nine types of the decorative portions having different ridge arrangement angles;
    a ridge arrangement angle, which is an angle formed by the ridges and a line tangent to the decorative region at an edge of an inner side in the tire radial direction, is the same in the same decorative portion, and a ridge arrangement angle of the contiguous decorative portion differs therefrom not less than 20° and not more than 160°;
    in all regions in the tire circumferential direction, at least one side in the tire radial direction of the decorative portion overlaps with the contiguous decorative portion;
    a first imaginary boundary line joining end portions of the ridges of the decorative portion that are on a side adjacent to the contiguous decorative portion and a second imaginary boundary line joining end portions of the ridges of the contiguous decorative portion on a side adjacent to the first imaginary boundary line extend from an inner side edge to an outer side edge in the tire radial direction, and a distance between the first imaginary boundary line and the second imaginary boundary line is less than 1 mm; and
    the ridges of the decorative portion are separated from the ridges of the contiguous decorative portion.

2. The pneumatic tire according to claim 1, wherein a plurality of the decorative portions is disposed in the decorative region in the tire circumferential direction, in order of stepwise ascending or descending size of the ridge arrangement angle.

3. The pneumatic tire according to claim 1, wherein in the decorative region, an angle formed by an end portion on an inner side in the tire radial direction of the first imaginary boundary line of the decorative portion and an end portion on the inner side in the tire radial direction of the first imaginary boundary line of the contiguous decorative portion is not more than 10°.

4. The pneumatic tire according to claim 1, wherein at least one of the decorative portions included in the decorative region has an arrangement pitch different than the arrangement pitch of the ridges included in the decorative portions.

5. The pneumatic tire according to claim 1, wherein ridges are not formed between the first imaginary boundary line and the second imaginary boundary line in the decorative region.

6. The pneumatic tire according to claim 1, wherein the first imaginary boundary line and the second imaginary boundary line overlap in the decorative region.

7. A pneumatic tire comprising a tread portion, a side wall portion, and a bead portion, wherein
    the side wall portion comprises, in a specific region in a tire radial direction, a decorative region including two or more decorative portions that are continuously disposed so as to be contiguous in a tire circumferential direction, the decorative portions including multiple convex ridges that are disposed on an outer surface so as to be adjacent in the tire circumferential direction;
    a ridge arrangement angle, which is an angle formed by the ridges and a line tangent to the decorative region at an edge of an inner side in the tire radial direction, is the same in the same decorative portion, and a ridge arrangement angle of the contiguous decorative portion differs therefrom not less than 20° and not more than 160°;
    in all regions in the tire circumferential direction, at least one side in the tire radial direction of the decorative portion overlaps with the contiguous decorative portion;
    a first imaginary boundary line joining end portions of the ridges of the decorative portion that are on a side adjacent to the contiguous decorative portion and a second imaginary boundary line joining end portions of the ridges of the contiguous decorative portion on a side adjacent to the first imaginary boundary line extend from an inner side edge to an outer side edge in the tire radial direction, and a distance between the first imaginary boundary line and the second imaginary boundary line is less than 1 mm;
    the ridges of the decorative portion are separated from the ridges of the contiguous decorative portion; and
    in the decorative region, an angle formed by an end portion on an inner side in the tire radial direction of the first imaginary boundary line of the decorative portion and an end portion on the inner side in the tire radial direction of the first imaginary boundary line of the contiguous decorative portion is not more than 10°.

8. The pneumatic tire according to claim 7, wherein a plurality of the decorative portions is disposed in the decorative region in the tire circumferential direction, in order of stepwise ascending or descending size of the ridge arrangement angle.

9. The pneumatic tire according to claim 8, wherein the decorative region includes not less than three types and not more than nine types of the decorative portions having different ridge arrangement angles.

10. The pneumatic tire according to claim 7, wherein at least one of the decorative portions included in the decorative region has an arrangement pitch different than the arrangement pitch of the ridges included in the decorative portions.

11. The pneumatic tire according to claim 7, wherein ridges are not formed between the first imaginary boundary line and the second imaginary boundary line in the decorative region.

12. The pneumatic tire according to claim 7, wherein the first imaginary boundary line and the second imaginary boundary line overlap in the decorative region.

13. A pneumatic tire comprising a tread portion, a side wall portion, and a bead portion, wherein
the side wall portion comprises, in a specific region in a tire radial direction, a decorative region including two or more decorative portions that are continuously disposed so as to be contiguous in a tire circumferential direction, the decorative portions including multiple convex ridges that are disposed on an outer surface so as to be adjacent in the tire circumferential direction;
a ridge arrangement angle, which is an angle formed by the ridges and a line tangent to the decorative region at an edge of an inner side in the tire radial direction, is the same in the same decorative portion, and a ridge arrangement angle of the contiguous decorative portion differs therefrom not less than 20° and not more than 160°;
in all regions in the tire circumferential direction, at least one side in the tire radial direction of the decorative portion overlaps with the contiguous decorative portion;
a first imaginary boundary line joining end portions of the ridges of the decorative portion that are on a side adjacent to the contiguous decorative portion and a second imaginary boundary line joining end portions of the ridges of the contiguous decorative portion on a side adjacent to the first imaginary boundary line extend from an inner side edge to an outer side edge in the tire radial direction, and a distance between the first imaginary boundary line and the second imaginary boundary line is less than 1 mm;
the first imaginary boundary line and the second imaginary boundary line overlap in the decorative region; and
the ridges of the decorative portion are separated from the ridges of the contiguous decorative portion.

14. The pneumatic tire according to claim 13, wherein a plurality of the decorative portions is disposed in the decorative region in the tire circumferential direction, in order of stepwise ascending or descending size of the ridge arrangement angle.

15. The pneumatic tire according to claim 14, wherein in the decorative region, an angle formed by an end portion on an inner side in the tire radial direction of the first imaginary boundary line of the decorative portion and an end portion on the inner side in the tire radial direction of the first imaginary boundary line of the contiguous decorative portion is not more than 10°.

16. The pneumatic tire according to claim 15, wherein the decorative region includes not less than three types and not more than nine types of the decorative portions having different ridge arrangement angles.

17. The pneumatic tire according to claim 13, wherein at least one of the decorative portions included in the decorative region has an arrangement pitch different than the arrangement pitch of the ridges included in the decorative portions.

18. The pneumatic tire according to claim 13, wherein ridges are not formed between the first imaginary boundary line and the second imaginary boundary line in the decorative region.

19. A pneumatic tire comprising a tread portion, a side wall portion, and a bead portion, wherein
the side wall portion comprises, in a specific region in a tire radial direction, a decorative region including two or more decorative portions that are continuously disposed so as to be contiguous in a tire circumferential direction, the decorative portions including multiple convex ridges that are disposed on an outer surface so as to be adjacent in the tire circumferential direction;
a ridge arrangement angle, which is an angle formed by the ridges and a line tangent to the decorative region at an edge of an inner side in the tire radial direction, is the same in the same decorative portion, and a ridge arrangement angle of the contiguous decorative portion differs therefrom not less than 20° and not more than 160°;
in all regions in the tire circumferential direction, at least one side in the tire radial direction of the decorative portion overlaps with the contiguous decorative portion;
a first imaginary boundary line joining end portions of the ridges of the decorative portion that are on a side adjacent to the contiguous decorative portion and a second imaginary boundary line joining end portions of the ridges of the contiguous decorative portion on a side adjacent to the first imaginary boundary line extend from an inner side edge to an outer side edge in the tire radial direction, and a distance between the first imaginary boundary line and the second imaginary boundary line is less than 1 mm;
the ridges of the decorative portion are separated from the ridges of the contiguous decorative portion; and
ridges are formed between the first imaginary boundary line and the second imaginary boundary line in the decorative region.

20. The pneumatic tire according to claim 19, wherein the decorative region includes not less than three types and not more than nine types of the decorative portions having different ridge arrangement angles.

* * * * *